(12) United States Patent
Matsuzaki et al.

(10) Patent No.: US 7,571,076 B2
(45) Date of Patent: Aug. 4, 2009

(54) PERFORMANCE MONITOR DEVICE, DATA COLLECTING METHOD AND PROGRAM FOR THE SAME

(75) Inventors: Hidenori Matsuzaki, Kawasaki (JP); Seiji Maeda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 96 days.

(21) Appl. No.: 11/733,379

(22) Filed: Apr. 10, 2007

(65) Prior Publication Data

US 2008/0040634 A1 Feb. 14, 2008

(30) Foreign Application Priority Data

Apr. 21, 2006 (JP) ............................. 2006-117862

(51) Int. Cl.
*G06F 11/30* (2006.01)
(52) U.S. Cl. .................... 702/182; 702/176; 702/177; 702/178; 702/179; 702/180; 702/181; 702/183; 702/186; 702/187; 714/45; 714/46; 714/47; 710/68; 709/247; 341/76; 341/77; 711/212; 711/214; 713/400; 713/500; 719/318; 377/1; 377/13; 377/15; 377/16
(58) Field of Classification Search ......... 702/176–183, 702/186, 187; 714/45–47; 710/68; 709/247; 341/76–77; 711/212, 214; 713/400, 500; 719/318; 377/1, 13, 15–16
See application file for complete search history.

(56) References Cited

U.S. PATENT DOCUMENTS

| 6,026,139 | A | 2/2000 | Hady et al. |
| 6,145,123 | A | 11/2000 | Torrey et al. |
| 6,918,065 | B1 | 7/2005 | Edwards et al. |
| 2005/0071515 | A1 | 3/2005 | DeWitt et al. |

FOREIGN PATENT DOCUMENTS

| EP | 1 100 017 | | 5/2001 |
| JP | 2001-142747 | * | 5/2001 |

* cited by examiner

*Primary Examiner*—Tung S Lau
*Assistant Examiner*—Sujoy K Kundu
(74) *Attorney, Agent, or Firm*—Oblon, Spivak, McClelland, Maier & Neustadt, P.C.

(57) ABSTRACT

A performance monitor device includes an input unit to input both of address information and event occurrence information, an address mask unit to determine an address area to which each piece of the inputted address information belongs, an execution frequency counter to count a number of times of execution of programs in the address areas, an execution frequency holding unit to hold a counting result of the number of times of execution, an event occurrence information counter to count the event occurrence information corresponding to the address areas having the counting result of the number of times of execution included within a predetermined number of highest ranks, a holding unit to hold a counting results of the event occurrence information, and a storing unit to store the counting result of the event occurrence information corresponding to the address area having the highest number of times of execution in predetermined periods.

11 Claims, 10 Drawing Sheets

PERFORMANCE MONITOR DEVICE, DATA COLLECTING METHOD AND PROGRAM FOR THE SAME

CROSS REFERENCE TO RELATED APPLICATIONS

This application is based upon and claims the benefit of priority from prior Japanese Patent Application No. 2006-117862 filed on Apr. 21, 2006, the entire contents of which are incorporated by reference herein.

BACKGROUND OF THE INVENTION

1. Field of the Invention

The present invention relates to a performance monitor device, a data collecting method and a program for the device and method. In particular, the present invention relates to a performance monitor device, a data collection method and a program for the data collection method, for collecting data used to evaluate operating conditions of a processor.

2. Description of the Related Art

A performance monitor device is provided for collecting data on an occurrence state of an event occurring in a processor. This performance monitor device is provided with counters each corresponding to each of events. Every time each event occurs, the performance monitor device increments a counter value of the counter corresponding to the event, and stores the counter values in an internal buffer called a trace buffer upon completion of a predetermined interval time.

In this way, each of the counter values obtained for each predetermined interval time is stored in the trace buffer, and thereby the performance monitor device can recognize the occurring states of the events for each interval time.

Alternatively, a method has been proposed in which statistical data on events that may influence performance deterioration of a processor to a large extent, and statistical data on the other events are stored in different memories, respectively (JP-A 2001-142747 (KOKAI)).

In a conventional performance monitor device, the number of counters is reduced by selecting only predetermined specific events in advance among a huge number of events occurring in a processor, and then counting the numbers of occurrences of these predetermined specific events.

Specifically, as shown in FIG. 1, counters associated respectively with predetermined events, for example, three counters C1 to C3 are arranged in a conventional performance monitor device, and the counters count the numbers of occurrences of the events associated with the counters C1 to C3, respectively. With this configuration, if the event associated with the counter C1 occurs, the counter C1 is incremented, if the event associated with the counter C2 occurs, the counter C2 is incremented, and if the event associated with the counter C3 occurs, the counter C3 is incremented.

This counting operation is repeated in every cycle. Upon completion of a predetermined time period (called an interval time INT, below), the counter values of the respective counters are stored in a trace buffer.

To be more precise, suppose that seven cycles are defined as one interval time INT as in FIG. 2, the events associated with the first, second and third counters C1, C2 and C3 (shown in FIG. 1) are called the first, second and third events EV1, EV2 and EV3, respectively. Then, as shown in FIG. 2, consider a case where the second event EV2 occurs in the first and second cycles, where the first and second events EV1 and EV2 occur in the third cycle, where no event occurs in the fourth and fifth cycles, and where the third event EV3 occurs in the sixth and seventh cycles, for example. In this case, when the interval time INT passes, the counter values of the counters C1, C2 and C3 are 1, 3 and 2, respectively.

These counter values are stored in the trace buffer upon completion of one interval time INT. After all the counter values of the counters C1 to C3 are stored, all the counter values of the counters C1 to C3 are reset. Thereafter, the counting operation is restarted for the next interval time INT.

In this way, the counter value of each of the counters C1 to C3 in each interval time is sequentially stored in the trace buffer.

Moreover, the performance monitor device is configured to measure program count (PC) values in each cycle. A PC value measured in any one of cycles (for example, in the last cycle) of one interval time INT is stored in the trace buffer in association with each of the counter values measured for the interval time INT.

FIG. 2 shows an example of data stored in the trace buffer. In this example, the counter values CXT1 (=1), CXT2 (=3) and CXT3 (=2) of the respective counters C1 to C3, and the PC value (0x87) measured in the last cycle of a first interval time INT1 are stored as data for the first interval time INT1. Similarly, the counter values CXT1 (=4), CXT2 (=6) and CXT3 (=1) of the respective counters C1 to C3, and the PC value (0x22) measured in the last cycle of a second interval time INT2 are stored as data for the second interval time INT2. For each of the following continuous interval times, the same kinds of data are sequentially stored.

As described above, in the trace buffer, the number of occurrences of each of particular events for each of the interval times INT1, INT2, ..., INTn, and the PC value measured in the last cycle of each of the interval times INT1, INT2, ..., INTn are stored in association with each other in chronological order. Such data is called trace data.

The trace data thus stored in the performance monitor device is used for tuning software.

However, the counter values CXT1 to CXT3 do not exactly show performance characteristics at a time of execution in a program area indicated by the PC value associated with the counter values CXT1 to CXT3. This is because, in such trace data, the numbers of event occurrences in all cycles of a certain interval time INT are stored as the counter values CXT1 to CXT3, while a PC value in any one of cycles of the certain interval time INT is stored as the PC value associated with these counter values. As a result, software tuning with such trace data may result in a failure to achieve an effect on sufficient performance improvement.

A possible countermeasure for solving such a problem is to shorten an interval time INT, and thereby corresponding accuracy of each PC value and counter values can be improved. However, the following problems occur in this case. Firstly, when the interval time INT is short, it is necessary to enlarge a buffer area for storing trace data. Secondly, in a case of a configuration in which trace data is stored in an external memory, trace data requires an external memory area to a large extent, and an increase in frequency of storing the trace data into the external memory lowers the availability of memory bandwidth.

BRIEF SUMMARY OF THE INVENTION

According to a first aspect of the embodiment of the invention, there is provided a performance monitor device including: an input unit configured to input, in chronological order, both of address information indicating addresses in a memory in which programs are stored, and event occurrence information indicating occurrences of an event caused by execution of the program; an address mask unit configured to determine an address area to which each piece of the inputted address information belongs; an execution frequency counter configured to count a number of times of execution of programs in each of the address areas; an execution frequency holding table configured to hold a counting result of the number of times of execution; an event occurrence information counter configured to count the event occurrence information corresponding to the address areas each having the counting result of the number of times of execution that is included within a predetermined number of highest ranks; a holding unit configured to hold a counting results of the event occurrence information; and a storing unit configured to store the counting result of the event occurrence information corresponding to the address area having the highest number of times of execution of programs in each of predetermined periods.

In accordance with a second aspect of the embodiment of the invention, there is provided a data collecting method including: inputting, in chronological order, both of address information indicating addresses in a memory in which programs are stored, and event occurrence information indicating occurrences of an event caused by execution of the program; determining an address area to which each piece of the inputted address information belongs; counting a number of times of execution of programs in each of the address areas; counting the event occurrence information corresponding to the address areas each having a number of times of execution that is included within a predetermined number of highest ranks; and storing the counting result of the event occurrence information corresponding to the address area having the highest number of times of execution of programs in every predetermined period.

In accordance with a final aspect of the embodiment of the invention, there is provided a program enabling a computer to: input, in chronological order, both of address information indicating addresses in a memory in which programs are stored, and event occurrence information indicating occurrences of an event caused by execution of the program; determine an address area to which each piece of the inputted address information belongs; count a number of times of execution of programs in each of the address areas; count the event occurrence information corresponding to the address areas each having a number of times of execution that is included within a predetermined number of highest ranks; and store the counting result of the event occurrence information corresponding to the address area having the highest number of times of execution of programs in every predetermined period.

DETAILED DESCRIPTION OF THE INVENTION

Figure 1:
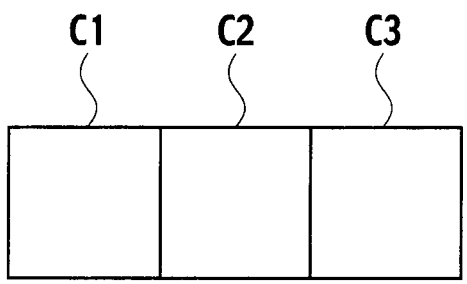
FIG. 1 is a schematic diagram for explaining conventional counters.

Hereinafter, detailed descriptions will be provided for embodiments of the present invention by referring to the accompanying drawings. The same reference numerals are given to the same components and elements throughout the drawings, and the description of the same components and elements are omitted. In addition, the drawings are schematic ones, and dimensions of every component or element are different from those of an actual one.

FIRST EMBODIMENT

Figure 3:
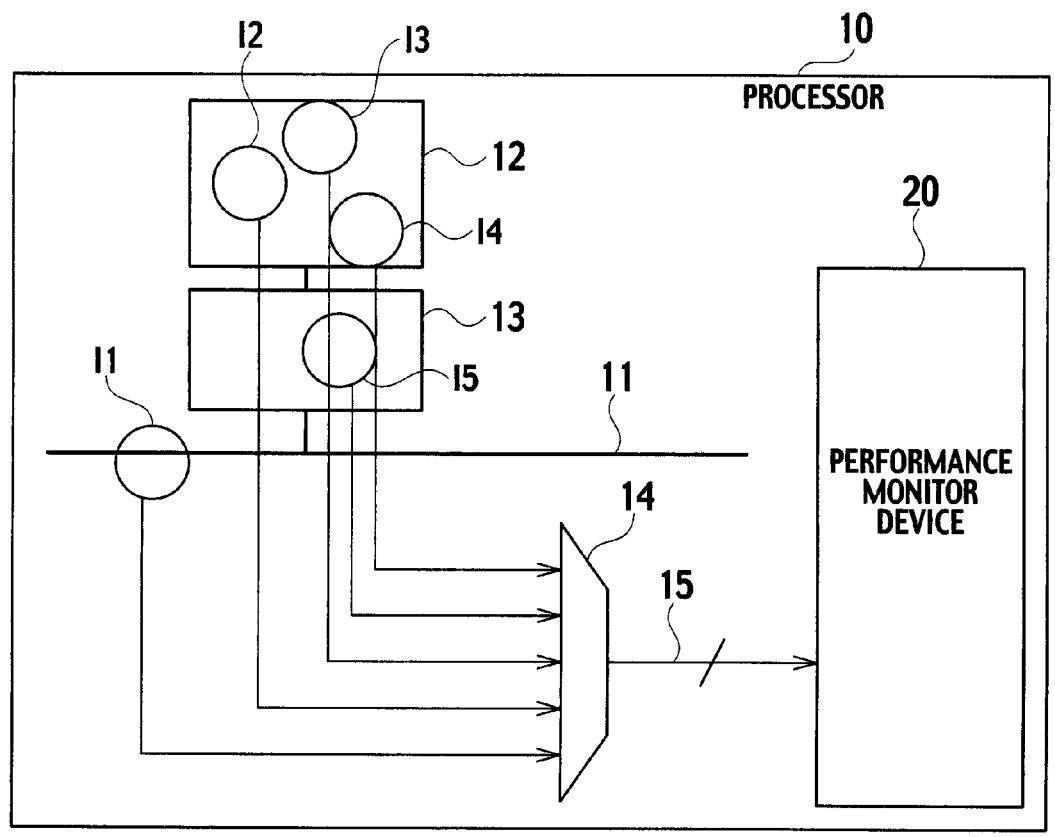
FIG. 3 is a block diagram showing a processor having a performance monitor device according to a first embodiment.

As shown in FIG. 3, in a processor 10 including a performance monitor device 20 according to a first embodiment of the present invention, events I1 to I5 for measuring performance are prepared respectively for a bus 11, a processor core 12, a second cache 13 and the like, and an event selector 14 selects a predetermined event from these events I1 to I5.

Here, the events mean information, for example, on whether or not a branch prediction succeeds, whether or not necessary data is stored in the second cache, how many times a memory is accessed, how many instructions are executed per cycle, and the like. Every time any of these events occurs, information indicating the event is outputted to the event selector 14 in the processor 10.

The event selector 14 provides information, which indicates whether or not predetermined events (in a case of this embodiment, events EVT1 to EVT3) occur, to the performance monitor device 20 through an event bus 15 in every cycle. For example, one bit in this information is assigned to each of the events EVT1 to EVT3. In addition, a bit (an event bit) corresponding to an event that has occurred is expressed as 1, and an event bit corresponding to an event that has not occurred is expressed as 0. As such, in this information, one bit is assigned to each of the events EVT1 to EVT3. Moreover, the event selector 14 receives program counter (PC) values from the processor core 12 in every cycle, and then provides these values to the performance monitor device 20 by using a part of the event bus. This PC value is a value of a register indicating an address in a main memory where a program to be executed is stored.

Figure 4:
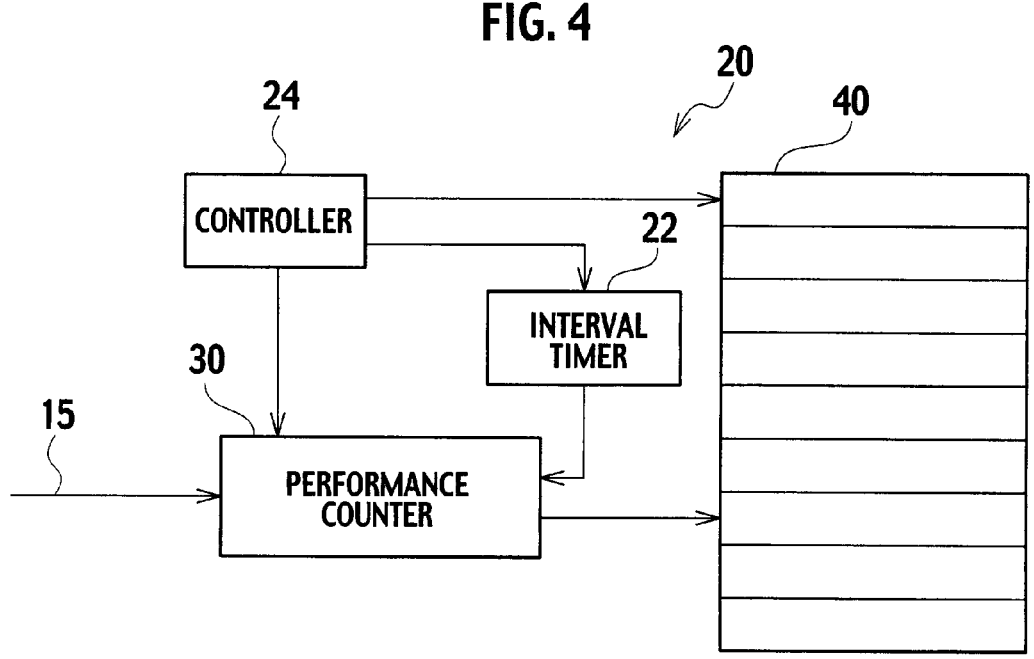
FIG. 4 is a block diagram showing the performance monitor device in the processor shown in FIG. 3.

As shown in FIG. 4, the performance monitor device 20 includes a performance counter 30, an interval timer 22, a trace buffer 40 and a controller 24.

The performance counter 30 receives the PC values and the information indicating whether or not each event has occurred, both of which are inputted through the event bus 15. Then, for each interval time, by using the PC values and the information, the performance counter 30 counts the numbers of occurrences of the events EVT1 to EVT3 (performance counter values) which are inputted each in association with an area indicated by a PC value where programs are executed with higher frequency.

The interval timer 22 counts a predetermined number of cycles (for example, 5000 cycles), and outputs its result to the controller 24 when the number of cycles reaches the predetermined number. Every time the interval timer 22 reaches the predetermined number of cycles, the controller 24 outputs certain performance counter values which are later described of the performance counter 30 to the trace buffer 40. In addition, the interval timer 22 initializes the performance counter 30 when it reaches the predetermined number of cycles.

Every time one interval time ends, the trace buffer 40 stores the performance counter values (the numbers of occurrences of the events EVT1 to EVT3) held in the performance counter 30.

Figure 5:
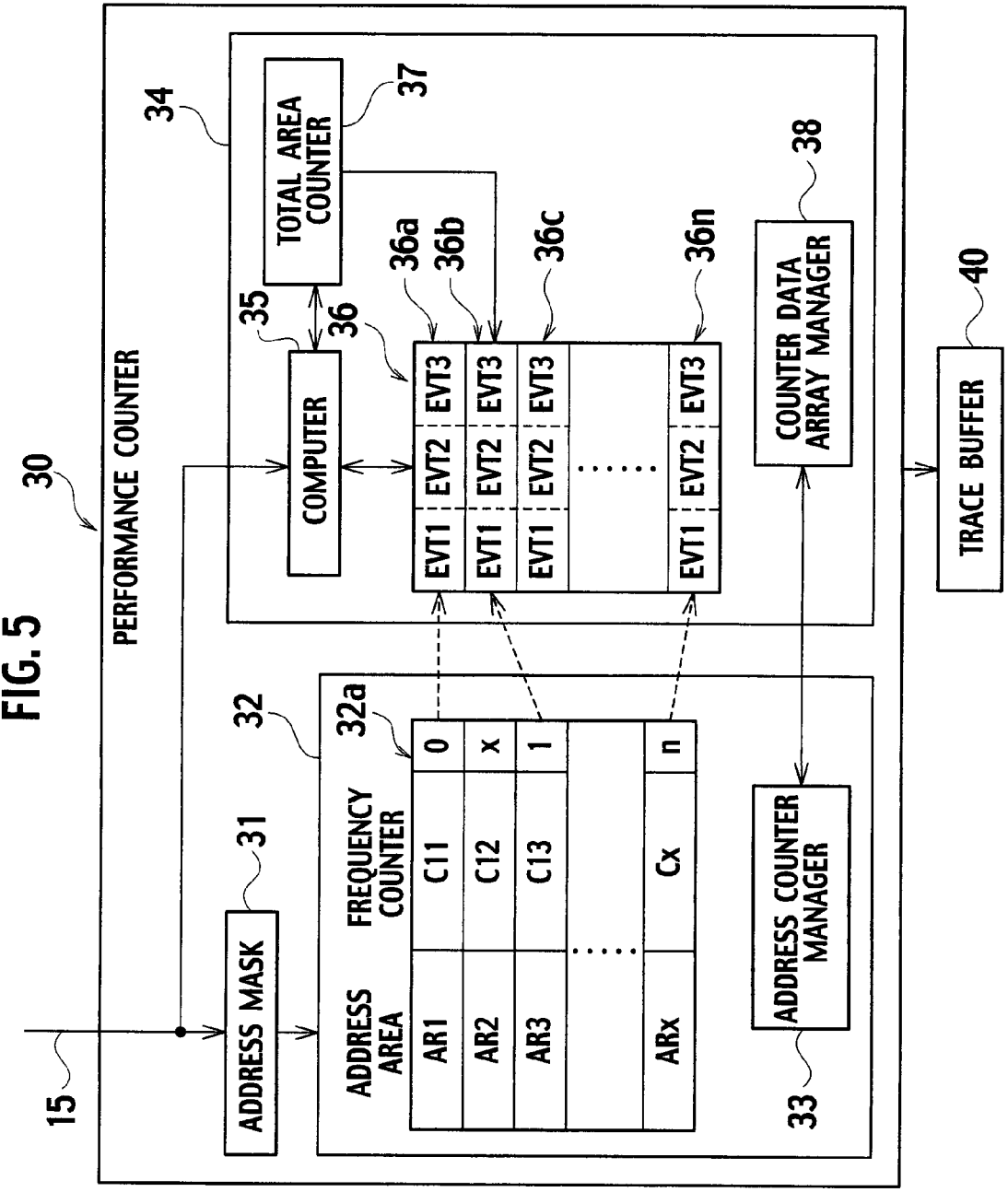
FIG. 5 is a block diagram showing a performance counter included in the performance monitor device shown in FIG. 4.

As shown in FIG. 5, the performance counter 30 includes an address mask 31, an address counter 32 and a performance counter value holding unit 34. From the information inputted through the event bus 15, information indicating the occurring states of the respective events EVT1 to EVT3 is inputted to the performance counter value holding unit 34 in every cycle, and the PC values are inputted to the address mask 31 in every cycle.

The address mask 31 classifies addresses indicated by the respective PC values into predetermined address areas (for example, each containing 128 bytes). Specifically, in a case of this embodiment, one instruction is expressed as a string of data containing 4 bytes. Accordingly, each PC value is data containing 4 bytes. The address mask 31 performs a logical AND operation on each inputted PC value and a mask value 0xffffff80, and thereby classifies the inputted PC value into an address area containing 128 bytes (32 instructions). Note that each predetermined address area is not limited to one containing 128 bytes in the present invention.

The PC value masked by the address mask 31 is provided to the address counter 32. The address counter 32 includes frequency counters C11, C12, ..., Cx respectively corresponding to predetermined areas AR1, AR2, ..., ARx, and increments a frequency counter corresponding to an area indicated by masked PC values provided from the address mask 31 (a certain area indicated by successive addresses). As a result, the counter value of each frequency counter shows the execution frequency of programs in the corresponding address area. Hence, by classifying the PC values into the predetermined address areas, and by incrementing the frequency counter corresponding to each address area, it is possible to prevent a table structure from becoming large in size as compared with a case where frequency counters are provided for all the addresses.

As described above, in the address counter 32, the execution frequency of programs in each of the address areas AR1, AR2, ..., ARx is updated as a counter value of a corresponding one of the frequency counters C11, C12, ..., Cx.

Note that the address counter is managed by the address counter manager 33.

Meanwhile, the performance counter value holding unit 34 includes a computer 35, a counter data array 36, a total area counter 37 and a counter data array manager 38. The computer 35 inputs information, indicating whether or not each of the events EVT1 to EVT3 has occurred, from the event bus 15 in every cycle. The counter data array 36 consists of n registers 36*a* to 36*n*, and the total area counter 37 counts all the information, indicating whether or not each of the events EVT1 to EVT3 has occurred, inputted in every cycle. Furthermore, the counter data array manager 38 manages the counter data array 36.

The n registers 36*a* to 36*n* of the counter data array 36 are associated with the address areas corresponding to the frequency counters with the highest to n-th counter values, among the address area AR1, AR2, ..., ARx corresponding to the frequency counter C11 to Cx in the address counter 32. In other words, a table cell (pointer fields) 32*a* of each of the address area AR1, AR2, ..., ARx in the address counter 32 holds a pointer value (a certain one of 1 to n) indicating an entry of each of the registers 36*a* to 36*n* in the counter data array 36. Upon receipt of an input from the event bus 15, the address counter 32 sends this pointer value to the counter data array 36. It should be noted that a pointer value is regarded as valid only when the pointer value is associated with any one of the address areas corresponding to the frequency counters of the highest n count values among the frequency counters C11 to Cx, and that a pointer value associated with any one of the other address areas is caused to take a predetermined value (for example, all "1") indicating an absence of a corresponding pointer.

With this configuration, every time a PC value is inputted from the event bus 15, a frequency counter (any one of the counters C11 to Cx) corresponding to a result of masking the PC value with the address mask 31 (any one of the address areas AR1 to ARx) is incremented, and the pointer value corresponding to the address area is sent to the counter data array 36.

For example, in FIG. 5, when the frequency counter C11 corresponding to the address area AR1 is incremented in response to an input from the event bus 15, the pointer value 0 corresponding to the address area AR1 is sent from the address counter manager 33 to the counter data array manager 38 of the performance counter value holding unit 34.

The counter data array manager 38 causes the computer 35 to update, by using the input from the event bus 15, an entry (any of the registers 36*a* to 36*n*) in the counter data array 36 corresponding to the pointer value sent from the address counter 32. For instance, if the pointer value 0 is sent from the address counter 32, the computer 35 updates the counter values (in this embodiment, the counter values of the respective events EVT1 to EVT3) stored in the first register 36*a* corresponding to the pointer 0 by using the input from the event bus 15 (information indicating whether or not each of the events EVT1 to EVT3 has occurred). For example, if the information indicating that only the event EVT1 has occurred is received as an input from the event bus 15, the computer 35 increments only the counter value of the event EVT1 in the register 36*a*. These counter values updated and held in the counter data array 36 are each called a performance counter value.

In this way, the counter data array 36 holds data on occurrence state of an event in each of the address areas corresponding to the highest n counter values in the address counter 32. Incidentally, consider a case where a frequency counter (any of C11 to Cx) is incremented, and where the pointer value of the address area (any of AR1 to ARx) corresponding to the frequency counter is an invalid value (for example, all 1). This case means that there is no corresponding register in the counter data array 36, and the computer 35 receiving an invalid pointer is configured not to update the counter data array 36. On the other hand, in response to every input from the event bus 15, the computer 35 updates the total area counter 37 every time by using the input, regardless of the pointer values. Thereby, the total area counter 37 increments one of the counter values corresponding to the events EVT1 to EVT3 occurring in every cycle.

Upon detection of completion of every interval time, the interval timer 22 sends the detection result to the address counter manager 33 and the counter data array manager 38 of the performance counter 30. Upon receipt of this detection result, the address counter manager 33 identifies the highest frequency counter having the largest counter value (highest frequency) among the counter values of the frequency counter C11 to Cx of the respective address areas AR1 to ARx in the address counter 32. Thereafter, to the counter data array manager 38, the address counter manager 33 sends the pointer value corresponding to the address area of the highest frequency counter (the address area with the highest execution frequency of programs). According to the pointer value received from the address counter manager 33, the counter data array manager 38 outputs the information thus read-out together with the information on an address area (any of AR1 to ARx) and the counter value (frequency information) of a frequency counter (any of C11 to Cx) corresponding to this performance counter value in the address counter 32 to the trace buffer 40.

The trace buffer 40 stores the information outputted from the performance counter 30 every time one interval time passes. Thereby, the trace buffer 40 sequentially stores the information indicating an address area having the highest execution frequency of programs among those in the event occurring states for each interval time, and the event occurring state corresponding to the information. As a result, by checking the trace buffer 40, it is possible to identify the address areas each having the high execution frequency of programs, and to know the performance counter values (the occurrence frequency of each event stored in the counter data array 36) of the address areas each having the high execution frequency of programs.

Here, consider a case where a frequency counter (any of C11 to Cx) is incremented, the address area corresponding to the incremented counter is selected by the address counter manager 33, and sends the pointer value of the selected address area to the counter data array manager 38, and also where the pointer value is an invalid value (for example, all 1). This case means that there is no register corresponding to this pointer value in the counter data array 36. In this case, the counter data array 36 is not updated by using the input (information indicating whether or not each of the events EVT1 to EVT has occurred) from the event bus 15. However, even in the case of the invalid pointer value, the counter data array 36 is updated in any one of the following cases.

Specifically, the first case is that there is an unused entry in the counter data array 36. This case means a state where not all of the registers 36a to 36n are in use in the counter data array 36. Accordingly, the counter data array manager 38 notifies the address counter manager 33 that there is an unused entry, and thereby the address counter manager 33 registers a pointer value corresponding to the unused entry by replacing the invalid pointer value. Thereafter, the counter data array manager 38 updates the corresponding entry.

Alternatively, the second case is that the execution frequency of programs (the counter value) of an inputted address area becomes higher than that of the address area having the highest n-th counter value in the address counter 32. This case means that the rank of the address area having the n-th execution frequency (the counter value) up to this moment becomes lower than the n-th. Accordingly, the address counter manager 33 makes the pointer value of the previous n-th address area invalid, and changes the pointer value (the invalid pointer value) of the inputted address area to the pointer value of the previous n-th address area. Then, the address counter manager 33 sends the pointer value to the counter data array manager 38, and thereby the counter data array manager 38 sets an initial value in the entry (the register) specified by this pointer value in the counter data array 36. This initial value is a value obtained by multiplying each of the counter values (the counter value of each of the events EVT1 to EVT3) in the total area counter 37 by the execution ratio of the new n-th address area. The execution ratio of the address area is a ratio of the counter value of the frequency counter (any of C11 to Cx) to the sum of the values of all the frequency counters (C11 to Cx). In a case where such a replacement is performed in the counter data array 36, the counter values continue being updated by using, as the initial values, the estimated values obtained by using the counter values in the total area counter 37 and the execution ratio of the address area. Then, all the values are initialized upon completion of one interval time. This makes it possible to minimize the influence of error caused by using the estimated values.

Figure 6:
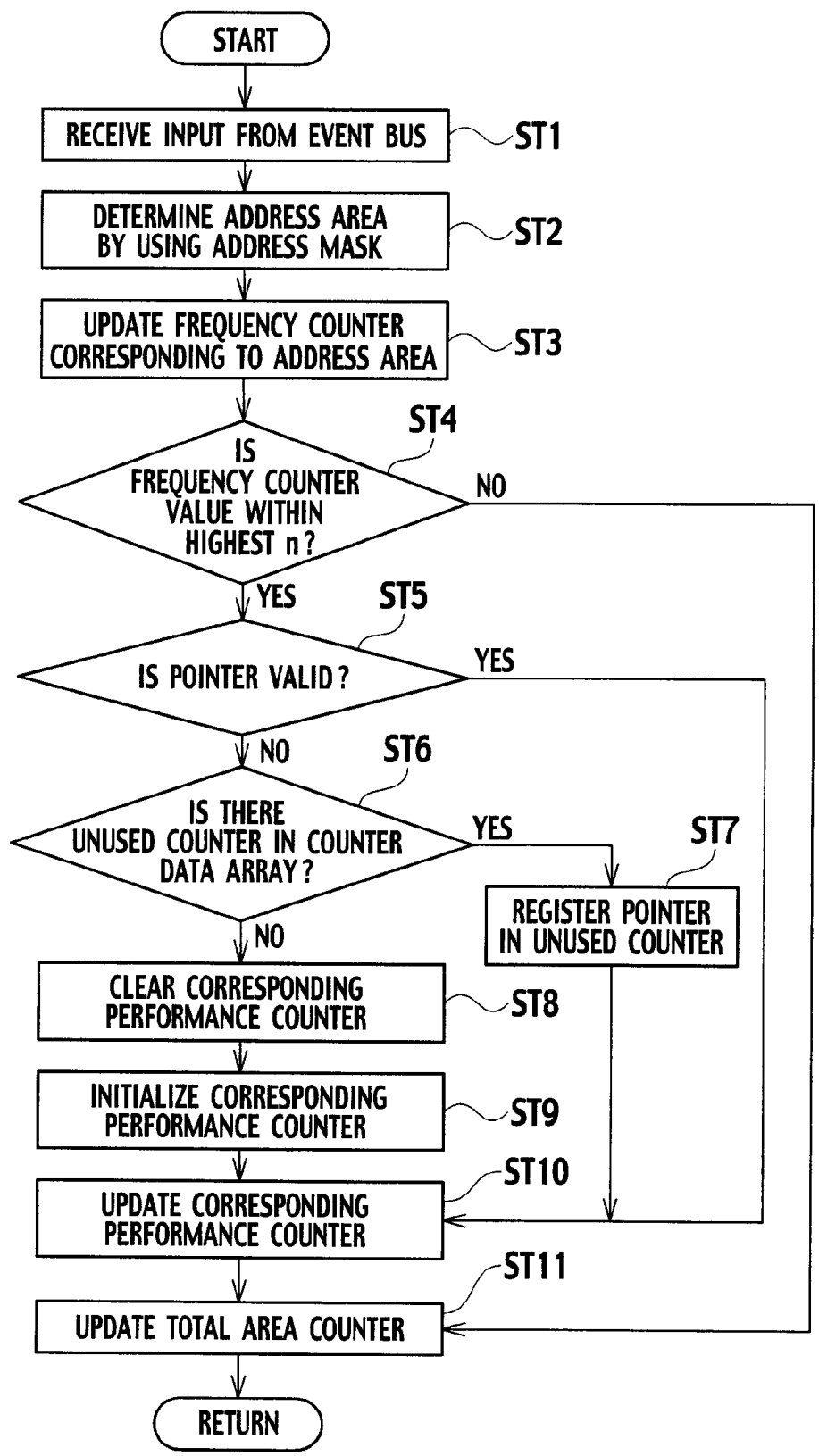
FIG. 6 is a flowchart showing a processing procedure in the performance counter shown in FIG. 5.

FIG. 6 shows a processing procedure in the performance counter 30. Incidentally, upon receipt of an input from the event bus 15 in every cycle, this processing procedure is started in every cycle and is executed in a pipelined manner.

In this processing procedure, upon receipt of an input from the event bus 15 in every cycle in step ST1, the performance counter 30 moves the processing to step ST2, and determines the address area indicated by the PC values included in the input from the event bus 15 by using the address mask 31.

Thereafter, the performance counter 30 moves the processing to step ST3, and updates the frequency counter (any of C11 to Cx) corresponding to the address area thus determined. Then, the performance counter 30 moves the processing to step ST4, and determines whether or not the counter value of the frequency counter that has been updated in the foregoing step ST3 is ranked among the highest n.

If the determination result is negative in step ST4, it means that the counter value of the updated frequency counter is not ranked among the highest n, and that no entry is set for this counter value in the counter data array 36. Accordingly, the performance counter 30 moves the processing from step ST4 to step ST11, and updates the total area counter 37 according to the input from the event bus.

In contrast to this, if the determination result is affirmative, it means that the counter value of the updated frequency counter is ranked among the highest n, and that an entry is set for this counter value in the counter data array 36. Accordingly, the performance counter 30 moves the processing from step ST4 to step ST5, and determines, by using the address counter manager 33, whether or not the pointer value of the address area corresponding to the updated frequency counter is set to a value (any of 1 to n) other than the invalid value in the pointer field 32.

If the determination result is affirmative in step ST5, it means that an entry (a register) has been already set for the address area in the counter data array 36 (the address area has been ranked among the highest n in terms of the counter value in the last update). Accordingly, the performance counter 30 moves the processing from step ST5 to step ST10, and updates the performance counter value of the performance counter (the register in the performance data array 36) corresponding to the address area.

In contrast to this, if the determination result is negative in step ST5, it means that no entry has been set for the address area in the counter data array 36 (the address area has not been ranked among the highest n in terms of the counter value in the last update). Accordingly, the performance counter 30 moves the processing from step ST5 to step ST6, and the address counter manager 33 inquires of the counter data array manager 38 whether or not there is at least one unused entry (register) in the counter data array 36.

If the determination result is affirmative in step ST6, the performance counter 30 moves the processing from step ST6 to step ST7 since the unused entry is available. Then, the counter data array manager 38 assigns one of the unused entries (registers) in the counter data array 36 to the address area determined in the forgoing ST2, and notifies the address counter manager 33 of this assigned entry. Then, the address counter manager 33 registers a pointer for this entry in the pointer field 32a. Thereafter, the processing moves to step ST10.

In contrast to this, if the determination result is negative in step ST6, it means that there is no unused entry (register) in the counter data array 36. In other words, this means that the address area (called the currently-updated address area) of the updated frequency counter has not been ranked among the highest n in terms of the counter value in the last update. In this case, since it is necessary to reassign an entry being used for another address area to the currently-updated address area, the performance counter 30 moves the processing from step ST6 to step ST8, and clears the corresponding performance counters (the register in the counter data array 36) by using the counter data array manager 38. To be more precise, in the counter data array 36, the counter data array manager 38 clears the entry used for the address area that in return drops to the highest n+1-th in terms of the frequency since the address area determined in the foregoing step ST2 becomes ranked at the highest n-th.

Subsequently, the performance counter 30 moves the processing to step ST9, and initializes the corresponding performance counters (the register in the counter data array 36) by using the counter data array manager 38. To be more precise, the counter data array manager 38 initializes each of the performance counters in the counter data array 36 by using, as an initial value, a value obtained by multiplying each counter value (each of the events EVT1 to EVT3) in the total area counter 37 by an execution ratio of the address area that is newly ranked at the n-th in terms of the frequency.

Thereafter, the performance counter 30 moves the processing to step ST10, and causes the computer 35 to update the performance counter values of the performance counter (the register in the performance data array 36) corresponding to the address area determined in the foregoing step ST2.

In addition, in step ST11, the performance counter 30 updates the total area counter value in the total area counter 37 by the computer 35, which update is based on the information indicating the occurring state of each of the events EVT1 to EVT3 inputted from the event bus 15.

In this way, the performance counter 30 updates the performance counter value of the register in the counter data array 36 (any of 36a to 36n) corresponding to each of the address areas whose event occurrence frequencies are ranked among the highest n in the address counter 32. This update by the performance counter 30 depends on the information indicating the occurring state of each of the events EVT1 to EVT3 inputted from the event bus 15.

Figure 2:
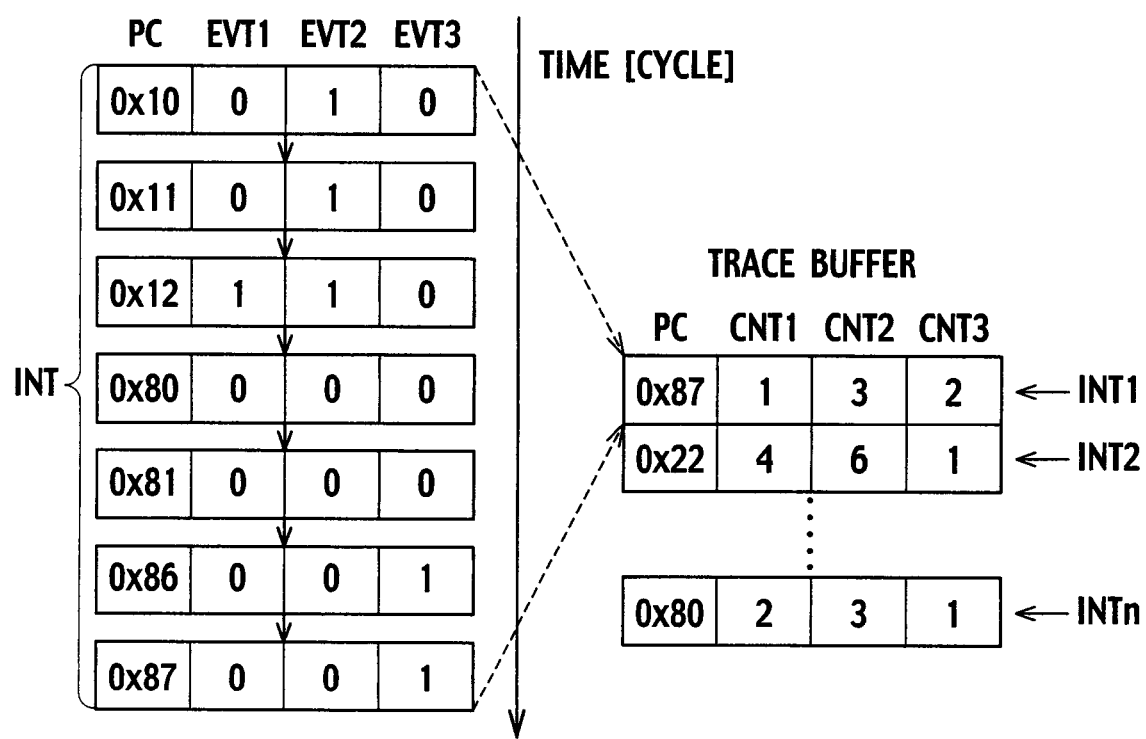
FIG. 2 is a schematic diagram for explaining a method of writing in a conventional trace buffer.

As has been described above, in the performance counter 30 according to this embodiment, an entry in the counter data array 36 is provided for each address area, and the information on these entries is stored in the trace buffer 40. Thereby, in the trace buffer 40, the data can be stored in a state where the performance counter values in the counter data array 36 are respectively associated with the address areas. In other words, an entry is provided in the counter data array 36 for each range of certain successive addresses, and this configuration makes it possible to keep a relationship between each of the performance counter values in the counter data array 36 and the corresponding address. Thus, unlike in the case of FIG. 2, it is possible to prevent the PC value from taking a value greatly different from a value actually corresponding to the number of occurrences of each of the events EVT1 to EVT3.

Moreover, the address mask 31 determines the address area indicated by an inputted PC value. This allows an entry in the counter data array 36 to be provided for a certain area determined by addresses, and prevents the structure of the counter data array 36 from becoming larger in size.

In addition, the counter data array 36 is provided with only the entries corresponding to the address areas where the execution frequencies of programs are ranked among the highest n. Thus, the counter data array 36 is provided with only the entries corresponding to the areas each having the possibility that the counter value in the frequency counter becomes the highest when one interval time passes. This configuration also prevents the structure of the counter data array 36 from becoming larger in size. Moreover, in a case where the execution frequency of programs in an address area that has not been ranked amount the highest n is newly ranked among the highest n, it is possible to change the entry from the previous one to a new one by using the total area counter 37.

Furthermore, the data stored in the trace buffer 40 indicates performance counter values corresponding to the address area where the execution frequency of programs is the highest in every interval time. This makes it possible to prevent the data volume stored in the trace buffer 40 from increasing, and to improve the corresponding accuracy of the stored performance counter values and address areas, in comparison with the conventional case. Thus, the corresponding accuracy of the stored performance counter values (the number of event occurrences) and address areas can be improved with the simple configuration.

SECOND EMBODIMENT

In the foregoing first embodiment, the descriptions have been provided for the case where the address mask in the address mask 31 is fixed. However the present invention is not limited to this case, and the address mask can be dynamically changed.

To be more precise, firstly, the performance counter values in the counter data array 36 are updated as is the case with the foregoing first embodiment. Then, when a shortage of the entries occurs in the counter data array 36, a range indicated by the address mask 31 is doubled (or 2^m times). Then, the address counter table (the address areas, the frequency counters and the pointer fields 32a) in the address counter 32, and each entry in the counter data array 36 are updated so as to correspond to the doubled range of the address mask 31. Thereby, successive address areas are combined into one new address area. As a result, it is possible to store the performance counter values (the number of occurrences of each of the events EVT1 to EVT3 stored in the counter data array 36) corresponding to more address areas than before.

This method automatically makes it possible to count performance data (the number of occurrences of each of the events EVT1 to EVT3) for each small address area in a case of a program causing instructions each requiring only a small address range for the execution, and to count performance data for each large address area in a case of a program causing instructions each requiring a large address range for the execution. Moreover, this configuration can prevent the performance counter values from being lost, though the loss may occur due to a replacement of address areas in the counter data array 36.

Figure 7:
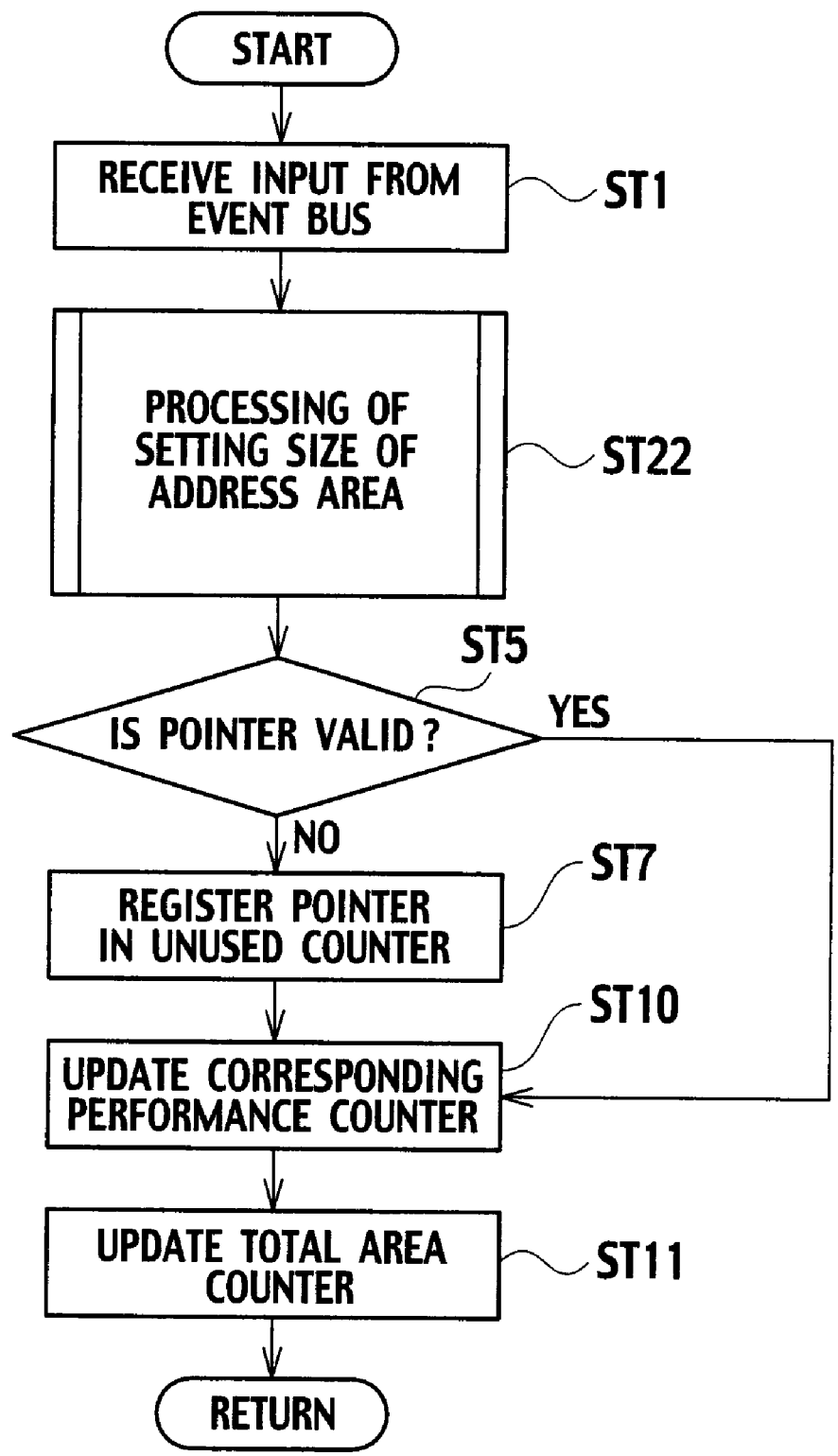
FIG. 7 is a flowchart showing a processing procedure in a performance counter according to a second embodiment.
Figure 8:
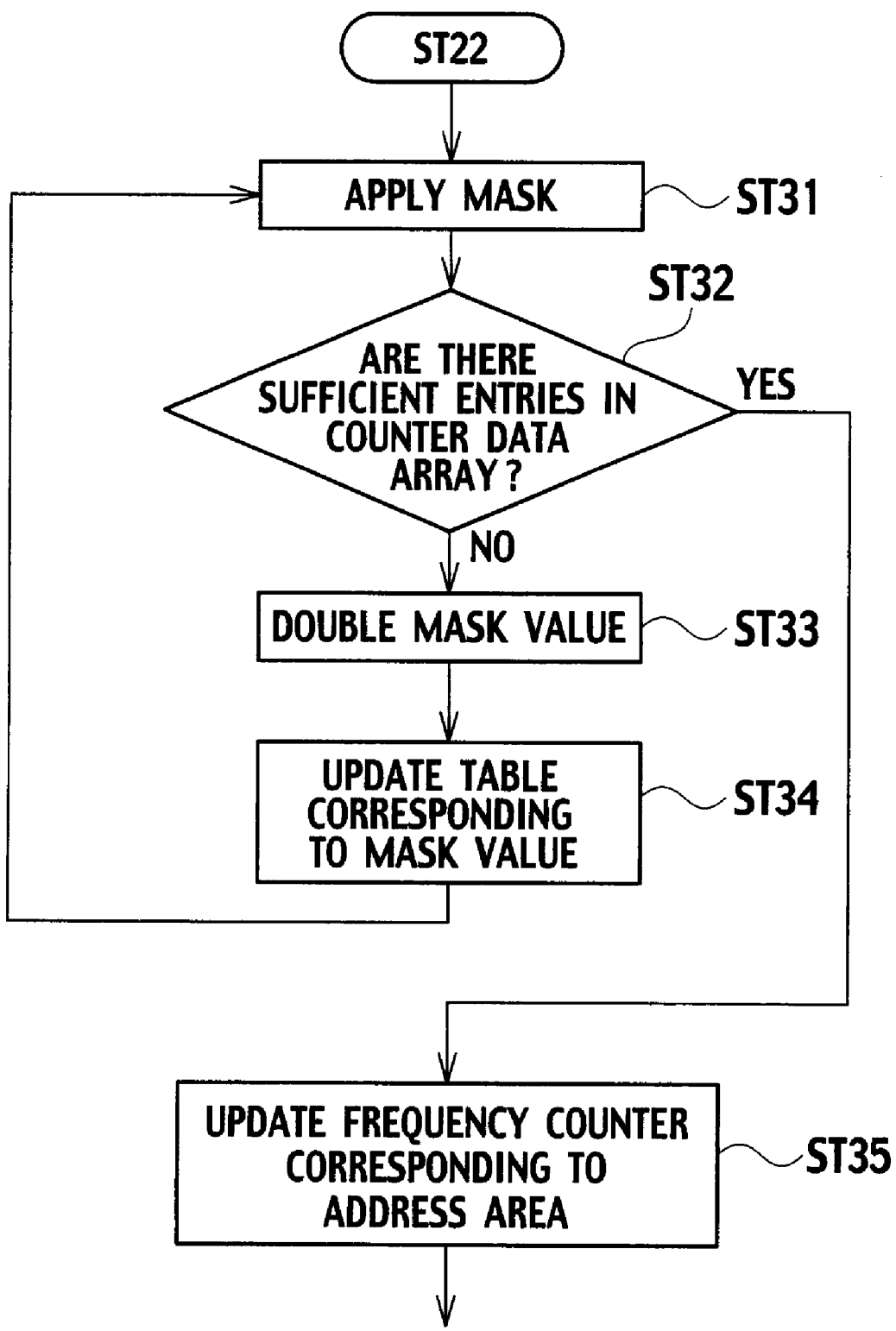
FIG. 8 is a flowchart showing a detail of the mask processing shown in FIG. 7.

FIGS. 7 and 8 show a processing procedure in the performance counter 30 according to this embodiment. Note that, in FIG. 7, the same reference numerals are given to the same processing steps as those in FIG. 6, and the description of the same steps are omitted.

In the processing procedure shown in FIG. 7, steps ST2 and ST3 in the processing procedure shown in FIG. 6 are replaced with step ST22. Moreover, step ST4 shown in FIG. 6 is removed since all address areas are to be counted. In addition, steps ST8 and ST9 shown in FIG. 6 are removed since it is not necessary to replace the entry in the counter data array 36. Furthermore, in the below-described step ST22 in FIG. 7, a range of addresses expressed with the address mask 31 is changed to a range larger than before in response to a shortage of the entries in the counter data array 36. Then, in step ST22, the address counter table (the address areas, the frequency counters and the pointer fields 32a) in the address counter 32, and each entry in the counter data array 36 are updated so as to correspond to the mask value thus changed. As a result, the execution of this step ST22 ensures the presence of an unused entry in the counter data array 36. For this reason, in this embodiment, step ST6 shown in FIG. 6 is omitted, and if the determination result is negative in step ST5, the processing moves from step ST5 to step ST7.

FIG. 8 shows a detailed procedure in step ST22 shown in FIG. 7. The performance counter 30 applies the address mask 31 to PC values included in an input from the event bus 15 in step ST31. In this way, an address area to which each PC value should belong is determined.

Thereafter, the performance counter 30 moves the processing to step ST32, and determines whether or not there are sufficient entries in the counter data array 36. To be more precise, the address counter manager 33 inquires the counter data array manager 38 whether or not the counter data array 36 has an entry for recording the address area determined in step ST31.

If the determination result is affirmative in this step ST32, it means that the entry corresponding to this address area already exists, or that an empty entry exists. The performance counter 30 moves the processing from step ST32 to step ST35, and updates the frequency counter of the corresponding address area in the address counter 32.

In contrast to this, if the determination result is negative in step ST32, it means that there is no entry corresponding to this address area in the counter data array 36, and also that there is no empty entry. Accordingly, the performance counter 30 moves the processing from step ST32 to step ST33, and doubles the currently held mask value of the address mask 31.

Subsequently, in step ST34, the performance counter 30 updates the address counter table (the address areas, the frequency counters and the pointer fields 32a) in the address counter 32, and the counter data array 36 so as to correspond to the mask value changed in step ST33. Specifically, the address counter manager 33 and the counter data array manager 38 respectively update the contents in the address counter 32 and the counter data array 36 so as to correspond to the new value of the address mask 31. To be more precise, entries of the respective address areas that are caused to belong to the same address area due to the doubled range of address area are merged into one entry. Then, the processing returns to the foregoing step ST31, and the same processing is repeated on the inputted PC value.

As has been described above, in this embodiment, even in a case where a shortage of the entries occurs in the counter data array 36, it is possible to store the performance counter values of all the address areas by widening a range expressed with the address mask 31, without causing the counter data array 36 to become larger in size.

As such, according to the foregoing configuration, it is possible to improve the corresponding accuracy of performance counter values and address areas with a simple configuration.

THIRD EMBODIMENT

In the first embodiment, the descriptions have been provided for the case where the same address mask 31 is commonly used for the address counter 32, but the present invention is not limited to this case. An address mask 31 may be prepared for each entry in the address counter 32.

Specifically, the performance counter values in the counter data array 36 are firstly updated as is the case with the foregoing first embodiment. Secondly, when a shortage of the entries occurs in the counter data array 36, a pair of address areas are found among the address areas having the entries in the counter data array 36 (alternatively, the pair is found in advance). Here, the pair of address areas are adjacent to each other, and the sum of the execution frequencies thereof is the smallest. Thirdly, an empty entry is generated in the counter data array 36 by merging the address areas belonging to this pair into one address area, and this empty entry is used for counting the performance data of the new address area.

In this way, in a case of a shortage of the entries in the counter data array 36, only entries each having the relatively low execution frequency are merged. This allows the shortage of the entries to be solved while the accuracy of the performance counter values is maintained in the entries each having the relatively high execution frequency.

Figure 9:
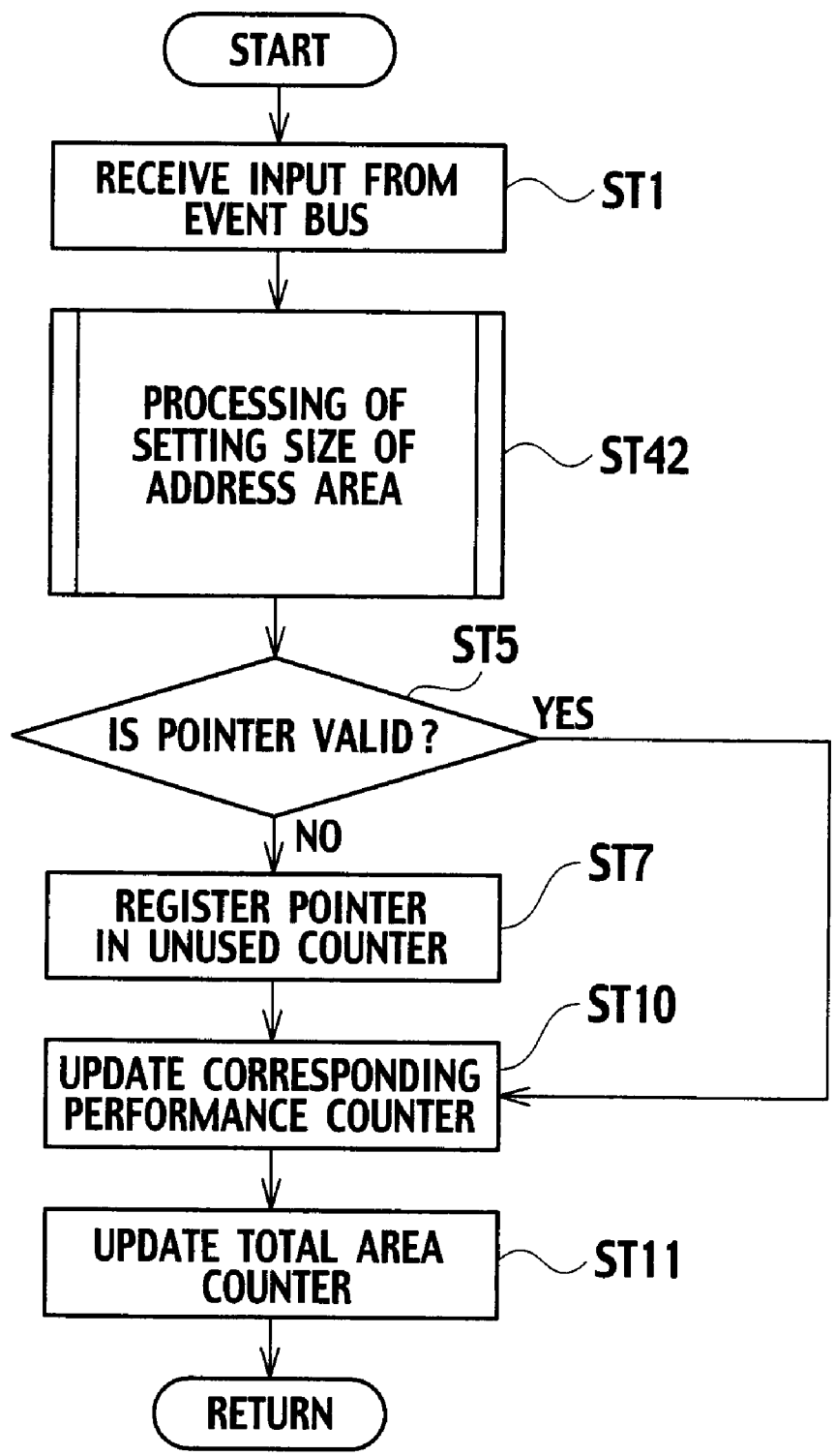
FIG. 9 is a flowchart showing a processing procedure of a performance counter according to a third embodiment.
Figure 10:
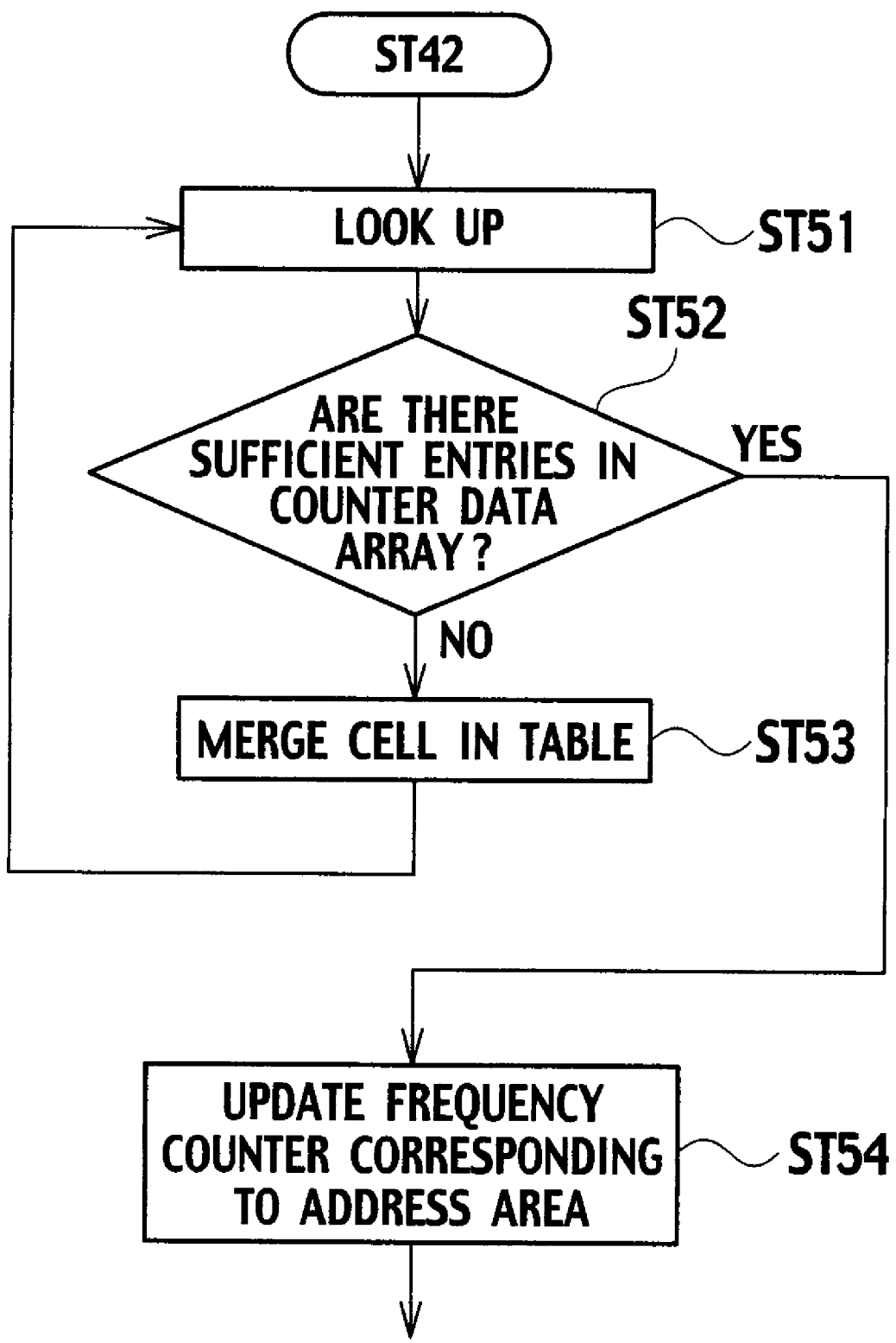
FIG. 10 is a flowchart showing a detail of the mask processing shown in FIG. 9.

FIGS. 9 and 10 show a processing procedure in the performance counter 30 according to this embodiment. Note that, in FIG. 9, the same reference numerals as those in FIG. 6 are given to the same processing steps as those in FIG. 6, and the descriptions of the same steps are omitted.

In the processing procedure shown in FIG. 9, steps ST2 and ST3 in the processing procedure shown in FIG. 6 are replaced with step ST42. Moreover, step ST4 shown in FIG. 6 is removed since all the address areas are to be counted. In addition, steps ST8 and ST9 shown in FIG. 6 are removed since it is not necessary to replace the entry in the counter data array 36. Furthermore, entries each having the relatively low execution frequency are merged in response to a shortage of the entries in the counter data array 36 in the below-described step ST42 in FIG. 9. As a result, the execution of this step ST42 ensures the presence of an unused entry in the counter data array 36. For this reason, in this embodiment, step ST6 shown in FIG. 6 is omitted, and if the determination result is negative in step ST5, the processing moves from step ST5 to step ST7.

FIG. 10 shows a detailed procedure in step ST42 shown in FIG. 9. In step ST51, the performance counter 30 searches the address counter table in the address counter 32 in order to determine whether or not an address area corresponding to PC values included in an input from the event bus 15 is already registered.

Thereafter, the performance counter 30 moves the processing to step ST52, and determines whether or not there are sufficient entries in the counter data array 36. To be more precise, the address counter manager 33 inquires the counter data array manager 38 whether or not there is an entry for recording this address area in the counter data array 36.

If the determination result is affirmative in this step ST52, it means that the entry corresponding to this address area already exists, or that an empty entry exists. The performance counter 30 moves the processing from step ST52 to step ST54, and updates the frequency counter of the corresponding address area in the address counter 32.

In contrast to this, if the determination result is negative in step ST52, it means that there is no entry corresponding to this address area in the counter data array 36, and also that there is no empty entry. Accordingly, the performance counter 30 moves the processing from step ST52 to step ST53, and performs a merge operation on the address counter table of the address counter 32 and the counter data array 36. Specifically, two address areas which are adjacent to each other, and which have the smallest sum of the execution frequencies are found, and the entries of the two address areas in the address counter 32 are merged into one entry by regarding the two address areas as one address area. More specifically, mask value of address mask 31 are changed to include those two address areas, thereby the counter value of the frequency counter corresponding to the one entry comes to total of counter value of those two address areas. Moreover, the performance counter 30 makes a request to the counter data array manager 38 to perform similar processing, and the counter data array manager 38 executes a merge operation on the corresponding entries in the counter data array 36. Thereby, one empty entry is always generated. Upon completion of the merge operation, the processing returns to the foregoing step ST51, and the same processing is repeated.

As described above, in a case of a shortage of the entries in the counter data array 36, only entries each having the relatively low execution frequency are merged. This allows the shortage of the entries to be solved while the accuracy of the performance counter values is maintained in the entries each having the relatively high execution frequency.

As such, according to the foregoing configuration, it is possible to improve the corresponding accuracy of performance counter values and address areas with a simple configuration.

FOURTH EMBODIMENT

In the foregoing first embodiment, the descriptions have been provided for the case where the same address mask 31 is commonly used for the address counter 32, but the present invention is not limited to this case. An address mask 31 may be prepared for each entry in the address counter 32.

Specifically, the performance counter values in the counter data array 36 are firstly updated as is the case with the foregoing first embodiment. Secondly, when a shortage of the entries occurs in the counter data array 36, founded are a pair of address areas which are adjacent to each other, and which have the execution frequencies closest to each other are found among the address areas having the entries in the counter data array 36 (alternatively, the pair is found in advance). Thirdly, an empty entry is generated in the counter data array 36 by merging the address areas belonging to this pair into one address area, and this empty entry is used for counting the performance data of the new address area.

In this way, in a case of a shortage of the entries in the counter data array 36, the merge operation is performed on only entries having a relatively close relationship in which the address areas are used in successive executions, respectively. This allows the shortage of the entries to be solved while the accuracy of the performance counter values is maintained in the other entries.

Figure 11:
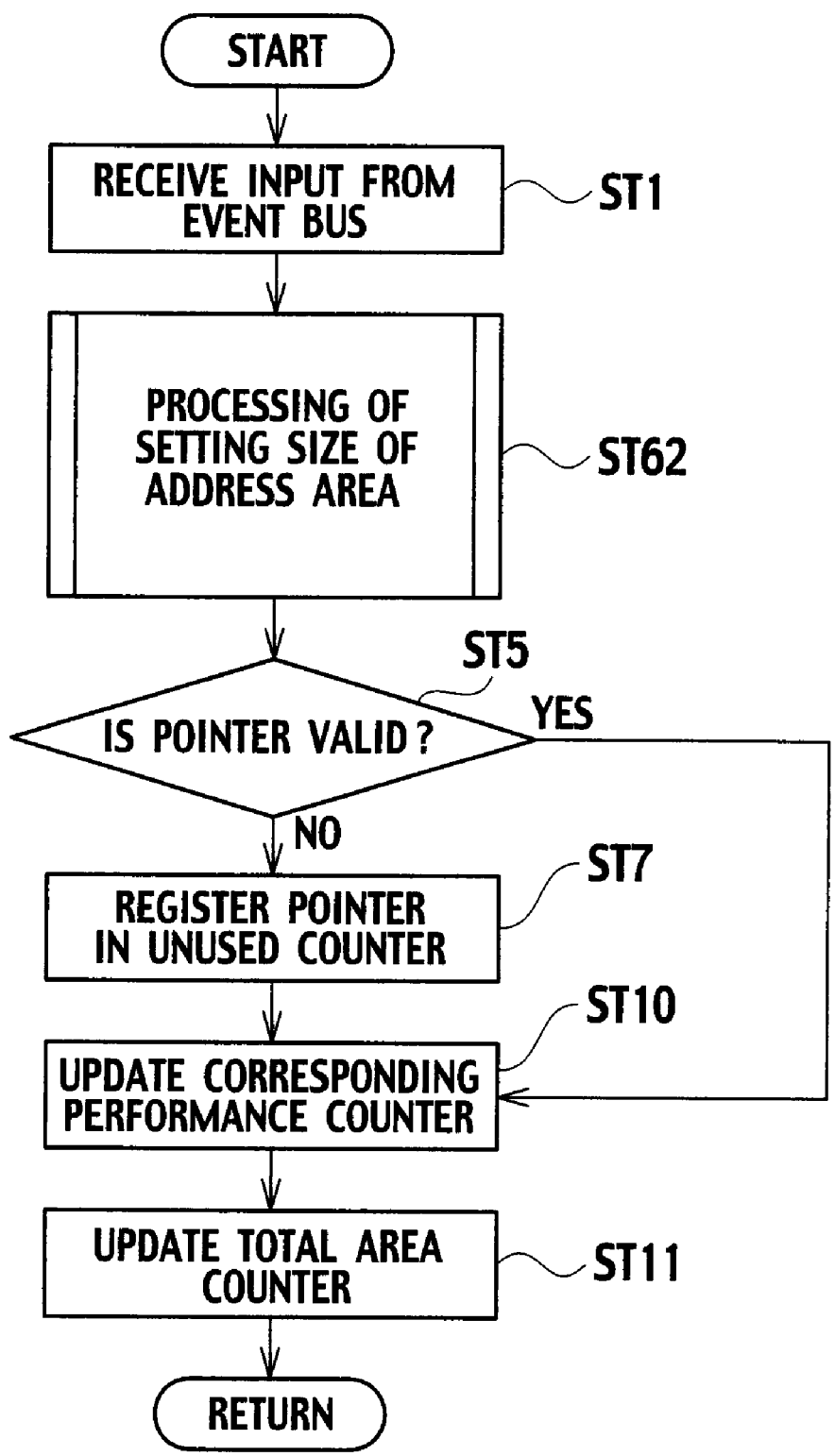
FIG. 11 is a flowchart showing a processing procedure of a performance counter according to a fourth embodiment.
Figure 12:
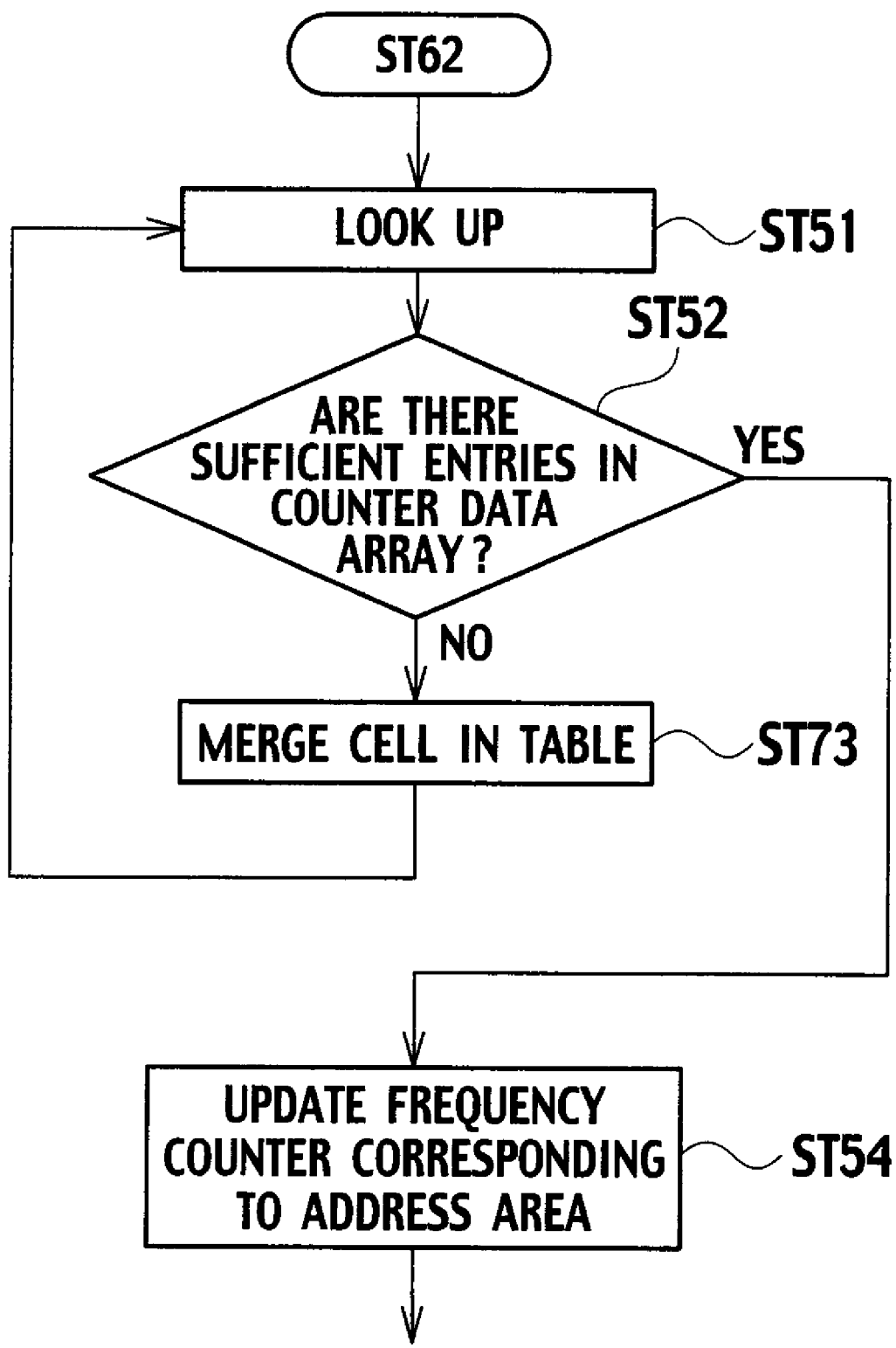
FIG. 12 is a flowchart showing a detail of the mask processing shown in FIG. 11.

FIGS. 11 and 12 show a processing procedure in the performance counter 30 according to this embodiment. Note that, in FIG. 11, the same reference numerals are given to the same processing steps as those in FIG. 6, and the descriptions of the same steps are omitted.

In the processing procedure shown in FIG. 11, steps ST2 and ST3 in the processing procedure shown in FIG. 6 are replaced with step ST62. Moreover, step ST4 shown in FIG. 6 is removed since all the address areas are to be counted. In addition, steps ST8 and ST9 shown in FIG. 6 are removed since it is not necessary to replace the entry in the counter data array 36. Furthermore, in the below-described step ST62 in FIG. 11, an empty entry is generated in the counter data array 36 in response to a shortage of the entries in the counter data array 36. As a result, the execution of this step ST62 ensures the presence of an unused entry in the counter data array 36. For this reason, in this embodiment, step ST6 shown in FIG. 6 is omitted, and if the determination result is negative in step ST5, the processing moves from step ST5 to step ST7.

FIG. 12 shows a detailed procedure in step ST62 shown in FIG. 11. Note that the same reference numerals as those in FIG. 10 are given to the same processing steps as those in FIG. 10, and the descriptions of the same steps are omitted.

If the determination result is negative in step ST52 for determining whether or not there are sufficient entries in the counter data array 36, the performance counter 30 moves the processing from step ST52 to step ST73, and performs a merge operation on the address counter table of the address counter 32 and the counter data array 36. Specifically, two address areas which are adjacent to each other, and which have the execution frequencies closest to each other are found, and then the entries of the two address areas in the address counter 32 are merged into one entry by regarding the two address areas as one address area. More specifically, mask value of address mask 31 are changed to include those two address areas, thereby the counter value of the frequency counter corresponding to the one entry comes to total of counter value of those two address areas. Moreover, the performance counter 30 makes a request to the counter data array manager 38 to perform similar processing, and the counter data array manager 38 executes the merge operation on the corresponding entries in the counter data array 36. Thereby, one empty entry is always generated. Upon completion of the merge operation, the processing returns to the foregoing step ST51, and the same processing is repeated.

As described above, in a case of a shortage of the entries in the counter data array 36, the merge operation is performed on only entries having a relatively close relationship in which the address areas are used in successive executions, respectively. This allows the shortage of the entries to be solved while the accuracy of the performance counter values is maintained in the other entries.

As such, according to the foregoing configuration, it is possible to improve the corresponding accuracy of performance counter values and address areas with a simple configuration.

OTHER EMBODIMENT

In the foregoing performance counter 30, in a case where the execution frequency of programs in an address area corresponding to a new input becomes larger than the execution frequency of programs of the highest n-th address area, an entry used for the n-th address area in the counter data array 36 is released, and then is used as a performance counter for the new n-th address area. In terms of the method for initializing the counter (register) in the entry in this case, the description has been provided in the foregoing embodiment for the case where the performance counter value in the counter data array 36 is initialized by using, as the initial value, the value obtained by multiplying each counter value (a counter value of each of the events EVT1 to EVT3) in the total area counter 37, by the execution ratio of the new n-th address area. However, the present invention is not limited to this case, and any of the following initial values may be used for the new n-th address area. Firstly, the initial value may be a value obtained by subtracting a sum of the performance counter values of all the entries in the counter data array 36 from a value of a register (the total area counter 37) holding the performance counter value of all the address areas, and secondly, may be a predetermined value (for example, all 0).

Moreover, in terms of the method for writing the performance counter values in the trace buffer 40 upon completion of each interval time, the description has been provided in the foregoing embodiment for the case of writing the performance counter values of the address area having the highest execution frequency of programs. However, the present invention is not limited to this case. For example, it is possible to write in the trace buffer 40 the performance counter values of the address areas having the highest a occurrence frequencies (a is a value set by a user, or a predetermined value specific to hardware), and frequency information on these areas. This configuration allows the performance counter values and the frequency information of a plurality of address areas to be stored in the trace buffer 40 in a certain interval time. Thereby, more detailed performance analysis can be performed. Incidentally, in this case, it is also possible to write the total performance counter value (the value in the total area counter 37) of all the address areas together with the performance counter value of each of the address areas in the trace buffer 40. Thereby, the total performance counter value and the total frequency information of all the address areas can be stored in the trace buffer 40 in addition to the performance counter value and the frequency information corresponding to each of the address areas. As a result, an even more detailed performance analysis can be performed (for example, a comparison of a total behavior of all the address area with a behavior specific to each address area, and the like).

Alternatively, in terms of the method for writing in the trace buffer 40, it is also possible to write, in the trace buffer 40, all the performance counter values and the frequency information of the address areas each having the occurrence frequency equal to or higher than x (x is a value set by a user, or a predetermined value specific to hardware). This configuration makes it possible to determine address areas to be stored by using the execution frequency of programs as a threshold, and thereby to store, in the trace buffer 40, only the performance counter values and the frequency information corresponding to the address areas each having the high execution frequency, and each being a desired target for analysis and tuning. Incidentally, in this case, it is also possible to write the total performance counter values (the value in the total area counter 37) of all the address areas together with the performance counter value of each of the address areas in the trace buffer 40. Thereby, the total performance counter value and the total frequency information of all the address areas can be stored in the trace buffer 40 in addition to the performance counter value and the frequency information corresponding to each of the address areas. As a result, an even more detailed performance analysis can be performed (for example, a comparison of a total behavior of all the address area with a behavior specific to each address area, and the like).

Instead of the above, in terms of the method for writing in the trace buffer 40, it is also possible to write, in the trace buffer 40, all the performance counter values and the frequency information of all the address areas if the occurrence frequency of the address area having the highest execution frequency of programs is lower than y (y is a value set by a user, or a predetermined value specific to hardware). By employing this configuration, the following possible case can be supported. Specifically, the possible case is where use of the performance counter values of all the address areas is more effective in the performance analysis than use of the performance counter values of a certain address area, when programs are evenly executed in each address area, and also when a large number of the address areas are targeted for monitor.

Otherwise, in terms of the method for writing in the trace buffer 40, it is also possible to write, in the trace buffer 40, all the performance counter values of all the address areas if the sum of occurrence frequency of the address areas having the highest n execution frequencies of programs is lower than z (z is a value set by a user, or a predetermined value specific to hardware). By employing this configuration, the following possible case can be supported. Specifically, the possible case is where use of the performance counter values of all the address areas is more effective in the performance analysis than use of the performance counter value of a certain address area, when programs are evenly executed in each address area, and when a large number of the address areas are targeted for monitor. Incidentally, in this method, if the highest n address areas are used for executing programs in a concentrated manner, the performance counter value and frequency information corresponding to each address area can be stored in the trace buffer 40.

If not, the configuration of the foregoing embodiment may also employ the method for writing the total performance counter value (the value of the total area counter 37) of all the address areas together with the performance counter value of each of the address areas in the trace buffer 40. Thereby, the total performance counter value and the total frequency information corresponding to all the address areas can be stored in the trace buffer 40 in addition to the performance counter value and the frequency information corresponding to each of the address areas. As a result, an even more detailed performance analysis can be performed (for example, a comparison of a total behavior of all the address area with a behavior specific to each address area, and the like).

What is claimed is:
1. A performance monitor device comprising:
 a processor including an input unit configured to input, in chronological order, both of address information indicating addresses in a memory in which programs are stored, and event occurrence information indicating occurrences of an event caused by execution of the program;
 an address mask unit configured to determine an address area to which each piece of the inputted address information belongs;
 an execution frequency counter configured to count a number of times of execution of programs in each of the address areas;
 an execution frequency holding table configured to hold a counting result of the number of times of execution;
 an event occurrence information counter configured to count the event occurrence information corresponding to the address areas each having the counting result of the number of times of execution that is included within a predetermined number of highest ranks;

a holding unit being independent from the execution frequency holding table, configured to hold a counting result of the event occurrence information;

a storing unit configured to store the counting result of the event occurrence information for tuning a software corresponding to the address area having the highest number of times of execution of programs in each of predetermined periods;

a pointer field configured to hold pointer values indicating entries of the holding unit corresponding to the address areas;

an address counter manager configured to transmit the pointer values; and a counter data array manager configured to manage the holding unit based on the transmitted pointer values.

2. The device according to claim 1, wherein the storing unit stores the counting results of the event occurrence information corresponding to the address areas each having the number of times of execution of programs that is included within a predetermined number of highest ranks in each of the predetermined periods.

3. The device according to claim 1, wherein the storing unit stores the counting results of the event occurrence information corresponding to the address areas each having the number of times of execution of programs equal to or higher than a predetermined number in each of the predetermined periods.

4. The device according to claim 1, further comprising a total area counter configured to sequentially count the event occurrence information inputted via the input unit regardless of the address areas, wherein in a case where the highest one of the number of times of execution of programs is lower than a predetermined frequency in each of the predetermined periods, the storing unit stores the counting result of the total area counter in the predetermined cycle instead of the counting result of the event occurrence information corresponding to the address area having the highest number of times of execution frequency.

5. The device according to claim 1, further comprising a total area counter configured to sequentially count the event occurrence information inputted via the input unit regardless of the address areas, wherein in a case where a sum of the counting results of the event occurrence information corresponding to the address areas each having the number of times of execution that is included within a predetermined number of highest ranks is less than a predetermined value in each of the predetermined periods, the storing unit stores the counting result of the total area counter instead of the counting result of the event occurrence information corresponding to the address area having the highest number of times of execution.

6. The device according to claim 1, further comprising:

a total area counter configured to sequentially count the event occurrence information inputted via the input unit regardless of the address areas; and a controller, in a case where a first counting result of the event occurrence information corresponding to a first address area determined by the address mask unit is not held in the holding unit, and also where the number of times of execution of programs in the first address area determined by the address mask unit becomes higher than the number of times of execution of programs in a second address area of which a second counting result is held in the holding unit, which initializes the second counting result of the event occurrence information corresponding to the second address area by using the counting result of the total area counter, and which associates the initialized second counting result with the first address area determined by the address mask unit.

7. The device according to claim 6, wherein the controller performs the initialization by using, as an initial value, a value obtained by multiplying the counting result of the total area counter by an execution ratio of the address area determined by the address mask unit.

8. The device according to claim 6, wherein the controller performs the initialization by using, as an initial value, a difference between the counting result of the total area counter, and a sum of all counting results held in the holding unit.

9. The device according to claim 6, wherein the controller performs the initialization by using a predetermined value as an initial value.

10. A data collecting method in a performance monitor device including an input unit, an address mask unit, an execution frequency counter, an execution frequency holding table, an event occurrence information counter, a holding unit, a storing unit, a pointer field, and a counter data array manager, the method comprising:

inputting, in chronological order, both of address information indicating addresses in a memory in which programs are stored, and event occurrence information indicating occurrences of an event caused by execution of the program by the input unit;

determining an address area to which each piece of the inputted address information belongs by the address mask unit;

counting a number of times of execution of programs in each of the address areas the execution frequency counter;

holding a counting result of the number of times of execution in the execution frequency holding table;

counting the event occurrence information corresponding to the address areas each having a number of times of execution that is included within a predetermined number of highest ranks by the event occurrence information counter;

holding a counting result of the event occurrence information in the holding unit being independent from the execution frequency holding table;

holding pointer values indicating entries of the holding unit corresponding to the address areas in the pointer field;

managing the holding unit based on the pointer values by the counter data array manager; and storing the counting result of the event occurrence information for tuning a software corresponding to the address area having the highest number of times of execution of programs in every predetermined period in the storing unit.

11. A computer-readable storage medium having embedded therein instructions, which when executed by a processor, cause the processor to perform a method, the method comprising:

inputting, in chronological order, both of address information indicating addresses in a memory in which programs are stored, and event occurrence information indicating occurrences of an event caused by execution of the program;

determining an address area to which each piece of the inputted address information belongs;

counting a number of times of execution of programs in each of the address areas;

holding a counting result of the number of times of execution in an execution frequency holding table;

counting the event occurrence information corresponding to the address areas each having a number of times of execution that is included within a predetermined number of highest ranks;

holding a counting result of the event occurrence information in a holding unit being independent from the execution frequency holding table;

storing the counting result of the event occurrence information for tuning a software corresponding to the address area having the highest number of times of execution of programs in every predetermined period;

holding pointer values indicating entries of the holding unit corresponding to the address areas to a pointer field; and managing the holding unit based on the pointer values.

* * * * *